United States Patent [19]

Tsuboi et al.

[11] Patent Number: 5,335,183

[45] Date of Patent: Aug. 2, 1994

[54] METHOD AND APPARATUS FOR DETERMINING PROFILE OF CYLINDRICAL OBJECT

[75] Inventors: Akira Tsuboi, Kariya; Katsuhiko Takeuchi, Anjo, both of Japan

[73] Assignee: Toyoda Koki Kagbushiki Kaisha, Kariya, Japan

[21] Appl. No.: 822,952

[22] Filed: Jan. 21, 1992

[30] Foreign Application Priority Data

Jan. 21, 1991 [JP] Japan .................................. 3-019156

[51] Int. Cl.⁵ .......................................... G06F 15/46
[52] U.S. Cl. .................. 364/474.37; 33/546; 364/551.02
[58] Field of Search ............ 364/474.37, 551.02, 364/560, 474.03, 474.16–474.19, 474.35, 474.34; 82/11, 118, 903; 33/504, 546, 551, 552, 553, 554; 318/572

[56] References Cited

U.S. PATENT DOCUMENTS

| 3,840,994 | 10/1974 | Izumi et al. | 33/504 |
| 4,774,753 | 10/1988 | Holy et al. | 33/504 |
| 4,800,652 | 1/1989 | Ballas et al. | 33/552 |
| 4,974,165 | 11/1990 | Locke et al. | 364/474.37 |

FOREIGN PATENT DOCUMENTS

203933 10/1967 U.S.S.R. .................. 33/551

*Primary Examiner*—Jerry Smith
*Assistant Examiner*—Steven R. Garland
*Attorney, Agent, or Firm*—Oblon, Spivak, McClelland, Maier & Neustadt

[57] ABSTRACT

An apparatus for determining the profile of a cylindrical workpiece whose radius varies with axial position. The apparatus is equipped with a spindle head and a pair of detectors. The spindle head supports and rotates the workpiece. The detectors are mounted on opposite sides of the axis of rotation of the workpiece and detect the position of the outer surface of the workpiece. When the workpiece is being rotated, the spindle head is moved parallel to the axis of the spindle. As a result, the detectors cross the outer surface of the workpiece. Also, the detectors are moved radially along an ideal profile of the workpiece in synchronism with the movement of the head. A control unit calculates the average of first and second output signals from the detectors, respectively, and produces the average as the profile error. In another embodiment, only one detector is used. The control unit measures the profile while the detector is positioned on one side of the axis of the spindle. The output signal from the detector is stored as a first output signal in the control unit. Then, the detector is moved to the opposite side of the axis of the spindle. Under this condition, the profile is again measured. The output signal from the detector is stored as a second output signal. The profile error is calculated from the average of the stored, first and second output signals.

14 Claims, 14 Drawing Sheets

FIG. 6(a)

| No | Z | X | B |
|---|---|---|---|
| 0001 | Z1 | X1 | θ1 |
| 0002 | Z2 | X2 | θ2 |
| 0003 | Z3 | X3 | θ3 |
| ----- | ----- | ----- | ----- |

FIG. 6(b)

| No | Z | X | B |
|---|---|---|---|
| 0001 | Z1 | -X1 | -θ1 |
| 0002 | Z2 | -X2 | -θ2 |
| 0003 | Z3 | -X3 | -θ3 |
| ----- | ----- | ----- | ----- |

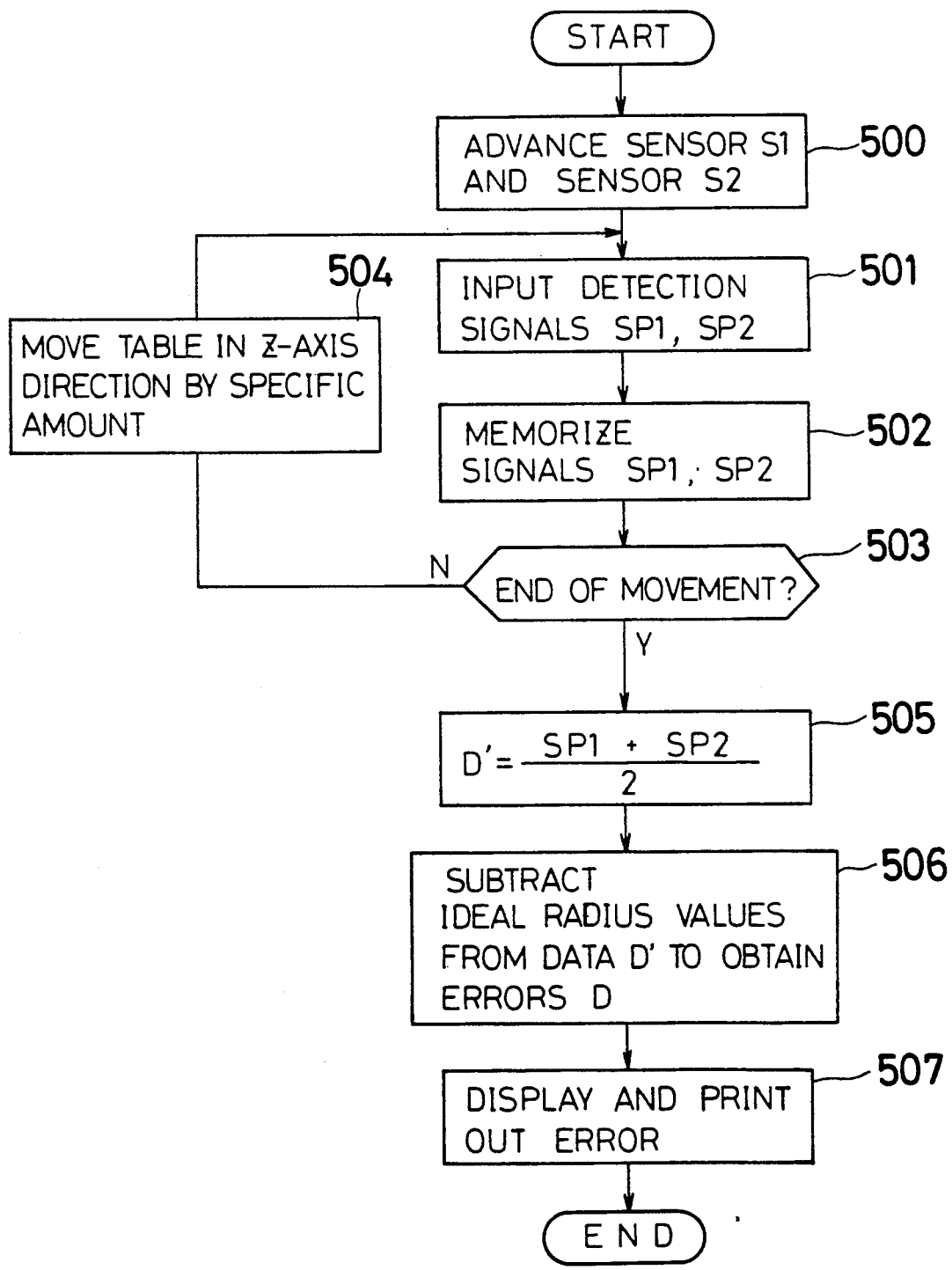

METHOD AND APPARATUS FOR DETERMINING PROFILE OF CYLINDRICAL OBJECT

FIELD OF THE INVENTION

The present invention relates to a method and an apparatus for determining the profile of a cylindrical object and, more particularly, to a method and an apparatus for determining the profile of a cylindrical workpiece which has been machined by a machine tool such as a lathe and the radius of which varies with axial position.

BACKGROUND OF THE INVENTION

An X-ray microscope has a mirror for gathering light. This mirror is indicated by M in FIG. 1(a) and has a hyperboloid R1 and a paraboloid R2. In order to form this mirror M by molding, a molding die having the same hyperboloid R1 and paraboloid R2 as those of the mirror M as shown in FIG. 1(b) is employed. This die is machined by a machine tool such as a lathe. In order to efficiently gather feeble x-rays coming from outer space, it is necessary to machine this die with high profile accuracy and with small surface roughness.

In such accurate machining, it is necessary to determine the profile of the workpiece machined by the machine tool at an accuracy of the order of 0.1 $\mu$m. However, when the above-described die is used, the diameter varies by several millimeters with axial position and, therefore, it is impossible to determine the profile at the required accuracy. That is, with the prior art measuring apparatus, it has been impossible to determine the profile of an object whose diameter changes greatly, at an accuracy of the order of 0.1 $\mu$m.

Where the profile of a workpiece is determined, a measuring instrument is installed outside a machine tool. The workpiece is removed from the machine tool. Then, the profile is determined. A correcting machining operation is carried out according to the result of the measurement. In this method, the machined workpiece is needed to be shifted from the machine tool to the measuring instrument for the determination of the profile. To machine the workpiece again, it is required to be returned to the machine tool. In this way, the efficiency of the operation is low. Also, when the workpiece is mounted again on the machine tool, the position at which the workpiece is installed deviates from the original position. This makes it impossible to accurately correct the contour of the workpiece that has been once machined.

In an attempt to eliminate the foregoing problems, the present inventor has contemplated a method of determining the profile of a workpiece while it is held on a machine tool. In this method, a detector for detecting the radial position of the outer periphery of a workpiece is mounted on one side of the axis of rotation of the workpiece. The spindle head which holds and rotates the workpiece is moved parallel to the axis of rotation of the workpiece. The manner in which the radius of the workpiece varies with axial position is known from the output signal from the detector. The profile of the workpiece is determined from the relation of the radius to the axial position.

In this method, the workpiece is displaced radially while the spindle head is moving because of an error introduced in the straightness of the table that supports the spindle head. As a result, the output signal from the detector involves the straightness error. Hence it is impossible to accurately measure the contour of the workpiece.

SUMMARY OF THE INVENTION

It is a main object of the present invention to provide a method and an apparatus for accurately determining the profile of a cylindrical object irrespective of the straightness error of a feed mechanism which moves the object axially.

It is another object of the invention to provide a method and an apparatus for accurately determining the profile of a cylindrical object by utilizing a machine tool.

In brief in accordance with the present invention, a moving mechanism for moving a spindle head axially of the head and either one detector or a pair of detectors are used. The spindle head holds and rotates a cylindrical object. Where a pair of detectors are used, they are mounted on opposite sides of the axis of rotation of the object. Where one detector is exploited, it is installed on one side of tile axis of rotation of the object.

Where a pair of detectors are used, the output signals from the detectors which are produced when the spindle head is being moved are referred to as the first and second output signals, respectively, herein. These two signals are stored in a memory. The average of these two signals is calculated. In one embodiment, the two detectors are moved radially of the cylindrical object in synchronism with the movement of the spindle head and according to data about an ideal profile of the object. In this embodiment, the calculated average value indicates the deviation from the ideal profile. In another embodiment, a pair of detectors are held in given radial positions. In this embodiment, the calculated average value represents the profile. An ideal profile is subtracted from the measured profile. Thus, the profile error is found.

Where one detector is employed, the spindle head is moved once. Then, the detector is moved to the opposite side of the axis of rotation of the cylindrical object. The spindle head is again moved. The detector output signal which is produced during the first movement of the spindle head is stored as a first output signal in the memory. The detector output signal which is produced during the second movement of the spindle head is stored as a second output signal in the memory. The average of these two signals is calculated.

Accordingly, the novel method and apparatus for determining the profile of a cylindrical object permit the profile and the profile error to be measured accurately irrespective of the error contained in the straightness of the feed mechanism that shifts the spindle head.

Also, in the novel method and apparatus for determining the profile of a cylindrical object, the determination is made by making use of a component of a machine tool. In consequence, an accurate measurement can be made on the machine tool. This enhances the efficiency of the measurement. Furthermore, it is not necessary to remove the cylindrical object from the machine tool. Therefore, the workpiece which has been once machined can be corrected accurately.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 6(a) is a table of data used for numerical control;

FIG. 6(b) is a table of data that form a mirror image with respect to the data listed in the table of FIG. 6(a);

FIG. 13 is a flowchart illustrating operations of a CPU used in a fourth embodiment of the invention to make a measurement.

DETAILED DESCRIPTION OF THE INVENTION

Figure 1A:
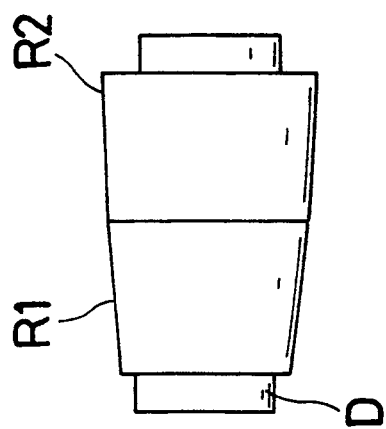
FIG. 1(a) is a side elevation of the light-gathering mirror of an X-ray microscope, the mirror being one example of cylindrical object.
Figure 1B:
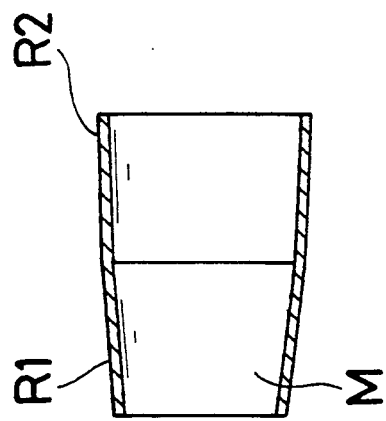
FIG. 1(b) is a side elevation of a molding die used to fabricate the mirror shown in FIG. 1(a)
Figure 2:
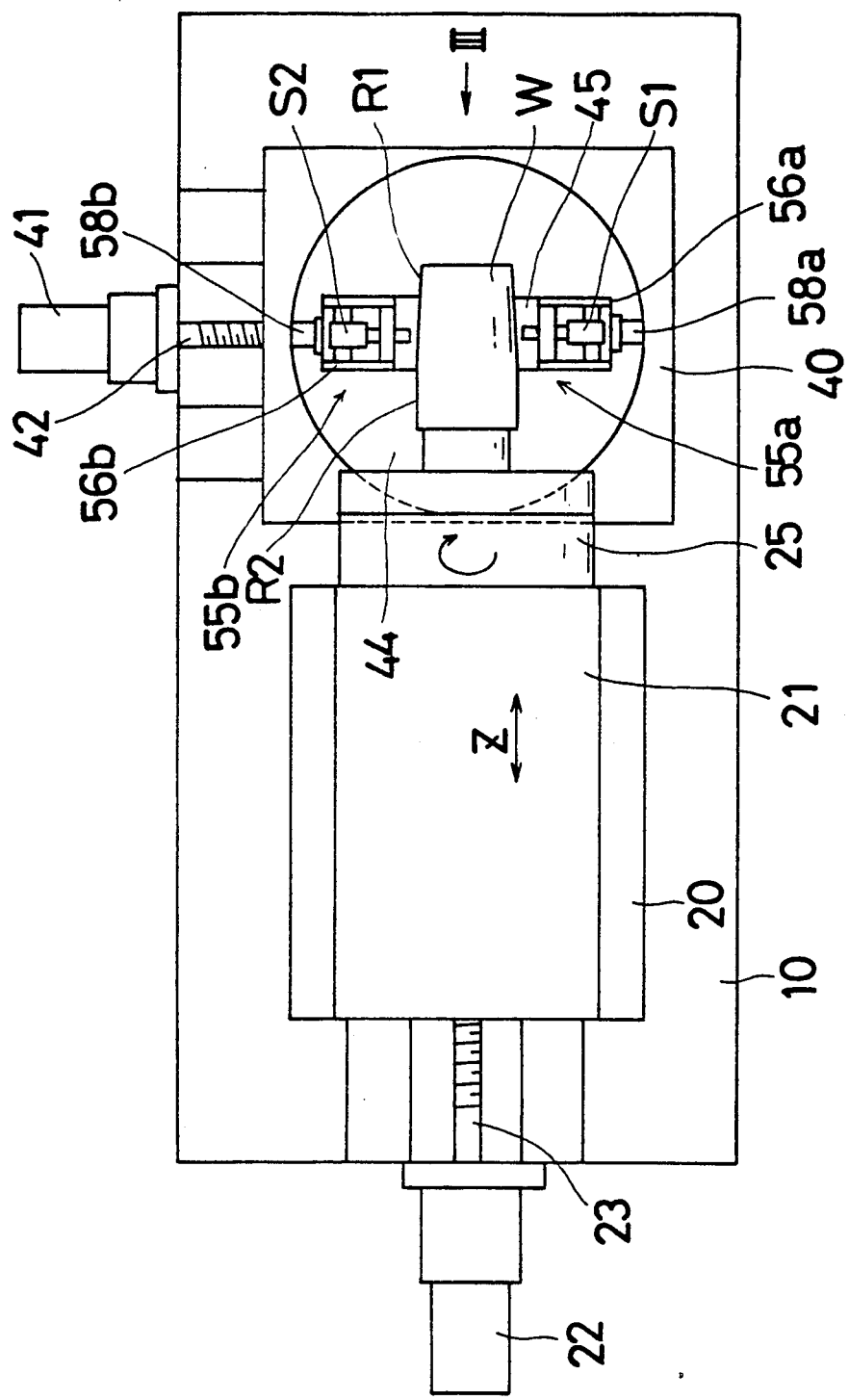
FIG. 2 is a plan view of a machine tool equipped with a measuring apparatus according to a first embodiment of the invention.

Referring to FIG. 2, there is shown a machine tool having a bed 10. A first sliding table 20 on which a spindle head 21 is placed is guided so as to be movable along the z-axis at one end of the bed 10 and moved by a feed screw 23 that is rotated by a servomotor 22. A spindle 25 is held to the spindle head 21 so as to be rotatable about the axis of the spindle which is parallel to the z-axis. The spindle 25 is rotated by a motor (not shown). A workpiece W is attached to the front end of the spindle 25 in such a way that the axis of rotation of the spindle 25 agrees with the axis of the spindle. The outer surface of this workpiece W has a hyperboloid R1 and a paraboloid R2.

At the other end of the bed 10, a second sliding table 40 is guided so as to be movable along the x-axis perpendicular to the axis of the spindle, i.e., perpendicular to the z-axis. The second sliding table 40 is moved by a feed screw 42 which is rotated by a servomotor 41. Placed on this second table 40 is a rotary table 44 which is rotated about a vertical line by a servomotor 43 (not shown), the vertical line being perpendicular to the axis of the spindle. A support table 45 extending across the axis of the spindle is installed on this rotary table 44. A pair of auxiliary sliding mechanisms 55a and 55b are mounted at both ends of the support table 45, i.e., on opposite sides of the axis of rotation of the workpiece W.

Figure 3:
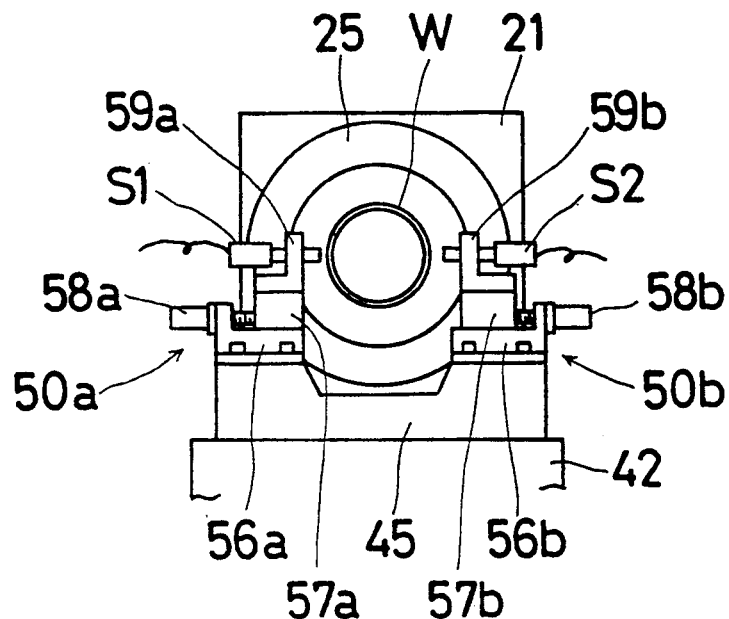
FIG. 3 is a fragmentary side elevation as viewed from the direction indicated by the arrow III of FIG. 2.

As shown in FIG. 3, the auxiliary sliding mechanism 55a comprises a base 56a, an auxiliary slide 57a, and a servomotor 58a that rotates a feed screw engaging with the auxiliary slide 57a. This auxiliary slide 57a is guided on the base 56a in such a way that it can move along the x-axis. Similarly, the other auxiliary sliding mechanism 55b is composed of a base 56b, an auxiliary slide 57b, and a servomotor 58b. Detectors S1 and S2 are mounted to these auxiliary slides 57a and 57b, respectively, or a tool T is mounted to the slide 57a.

Figure 4:
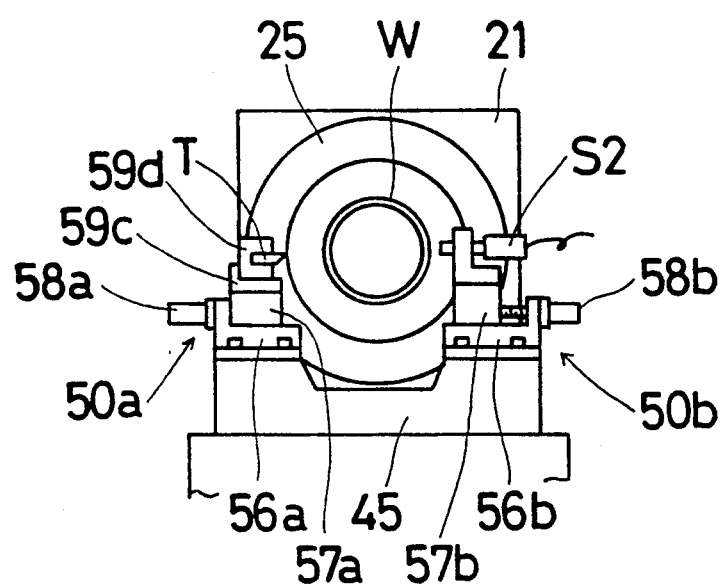
FIG. 4 is a side elevation similar to FIG. 3, but in which a tool for machining has been mounted.

Specifically, during a machining operation, as shown in FIG. 4, the tool T is mounted to the auxiliary slide 57a via a holding mount 59c and a mounting block 59d. During a measurement, as shown in FIG. 3, the detectors S1 and S2 are mounted to the auxiliary slides 57a and 57b, respectively, via holding mounts 59a and 59b, respectively. The detectors S1 and S2 each can consist of an electrostatic capacitance type displacement detector which detects the radial position of the outer surface of the workpiece W from the change in the electrostatic capacitance produced between the detector and the outer surface of the workpiece W. Each detector can also consist of a laser range finder.

Figure 5:
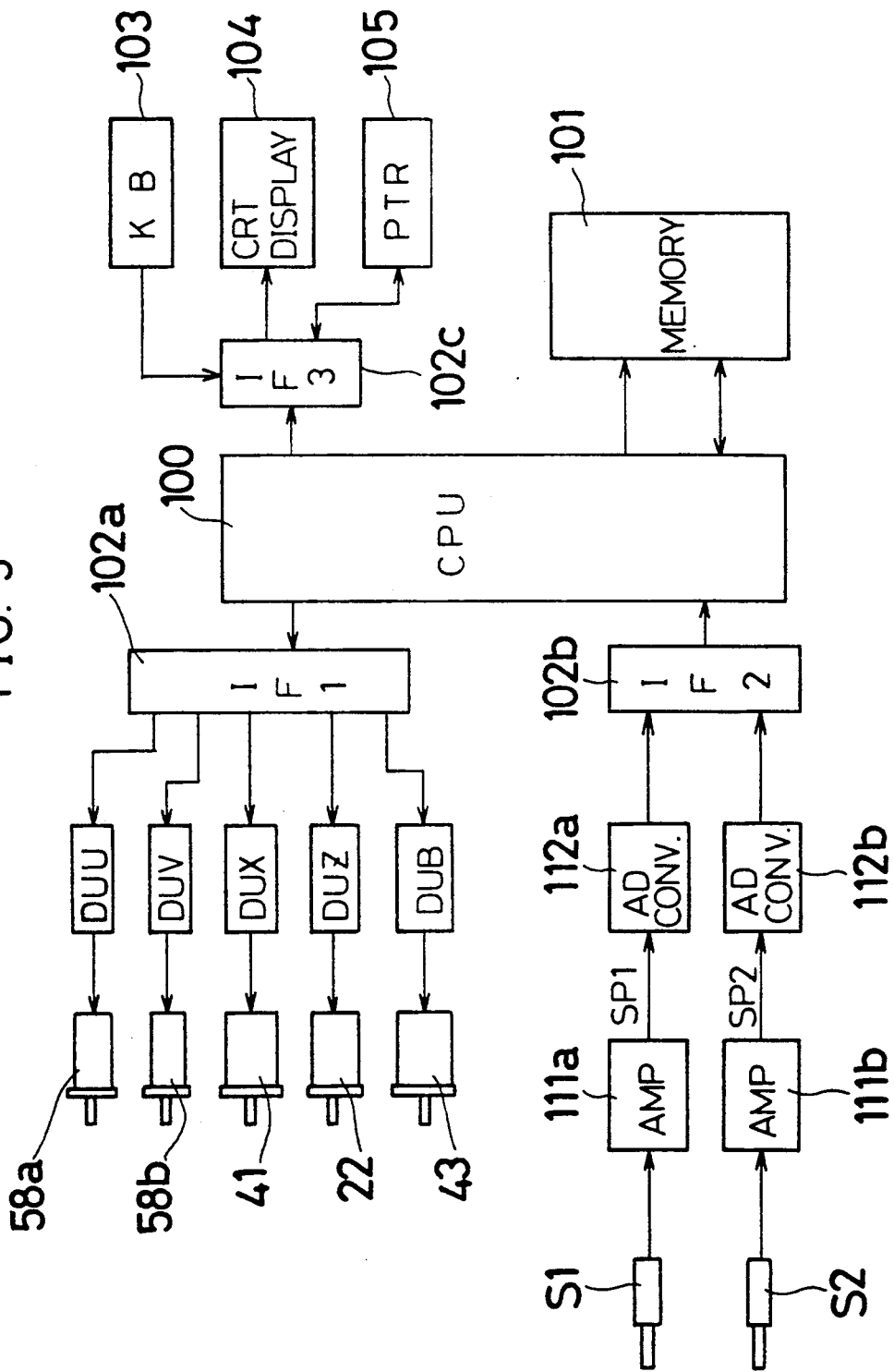
FIG. 5 is a block diagram of a numerical control apparatus for controlling the machine tool shown in FIG. 2.

Referring to FIG. 5, there is shown a numerical control apparatus for controlling tile machine tool shown in FIG. 2. This apparatus consists mainly of a CPU 100, a memory 101, interfaces 102a, 102b, and 102c. Driver circuits DUZ, DUX, DUB, DUU, and DUV for driving the above-described servomotors 22, 41, 43, 58a, 58b, respectively, are connected with the interface 102a. These driver circuits drive the servomotors 22, 41, 43, 58a, 58b, respectively, in response to instruction pulses distributed by the CPU 100. The detectors S1 and S2 are connected with the interface 102b via amplifiers 111a and 111b, respectively, and via A/D converters 112a and 112b, respectively. The detectors S1 and S2 produce first and second output signals SP1 and SP2, respectively, which are converted into digital form and then applied to the CPU 100. A keyboard 103, a display unit 104 consisting of a CRT, and a printer 105 are connected with the interface 102c. Data (FIG. 6(a)) about numerical control for machining is stored in the memory 101. This data represents changes in the position of the tool T relative to the workpiece W in the direction of the z-axis and changes in the position of the tool T in the direction of the x-axis. The data is calculated according to the required finished profile of the workpiece, i.e., an ideal profile. This data includes data along B-axis, i.e., data indicating the required angular position of the rotary table 44. This required angular position is so set that the longitudinal direction of the tool T is maintained perpendicular to the generatrix of the outer surface of the workpiece W. Z-axis data included in the data about the numerical control indicates the position of the tool T in the longitudinal direction relative to the end surface of the workpiece W on the side of the spindle 25. X-axis data included in the data about the numerical control indicates the position in the radial direction relative to the axis of the spindle. The operation of the above-described numerical control apparatus is next described.

Operation when the workpiece is machined

When the workpiece is to be machined, as shown in FIG. 4, the tool T is attached to the auxiliary slide 57a. Subsequently, a machining instruction switch installed on a control panel (not shown) is operated. Thus, the CPU 100 of the numerical control apparatus executes a program for machining. The individual items of the numerical control data shown in FIG. 6(a) are successively read out. Pulses are distributed among the driver circuits DUZ, DUX, and DUB according to the numerical control data. In this way, the hyperboloid R1 and the paraboloid R2 of the workpiece W are ground.

Operation when a measurement is made

Figure 7A:
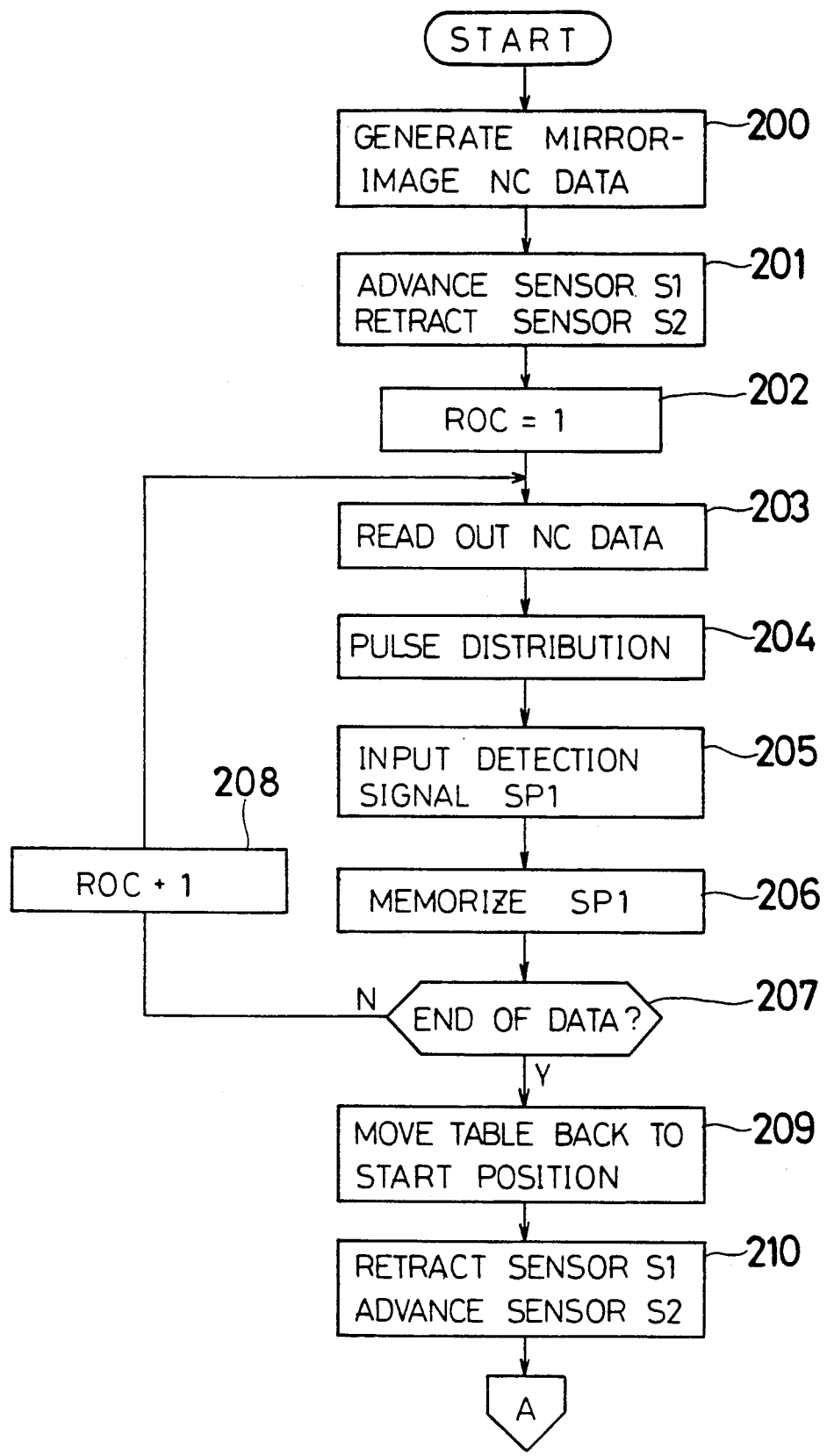
FIGS. 7, (a) and (b), are flowcharts illustrating operations performed by the CPU shown in FIG. 5 to make measurements.
Figure 7B:
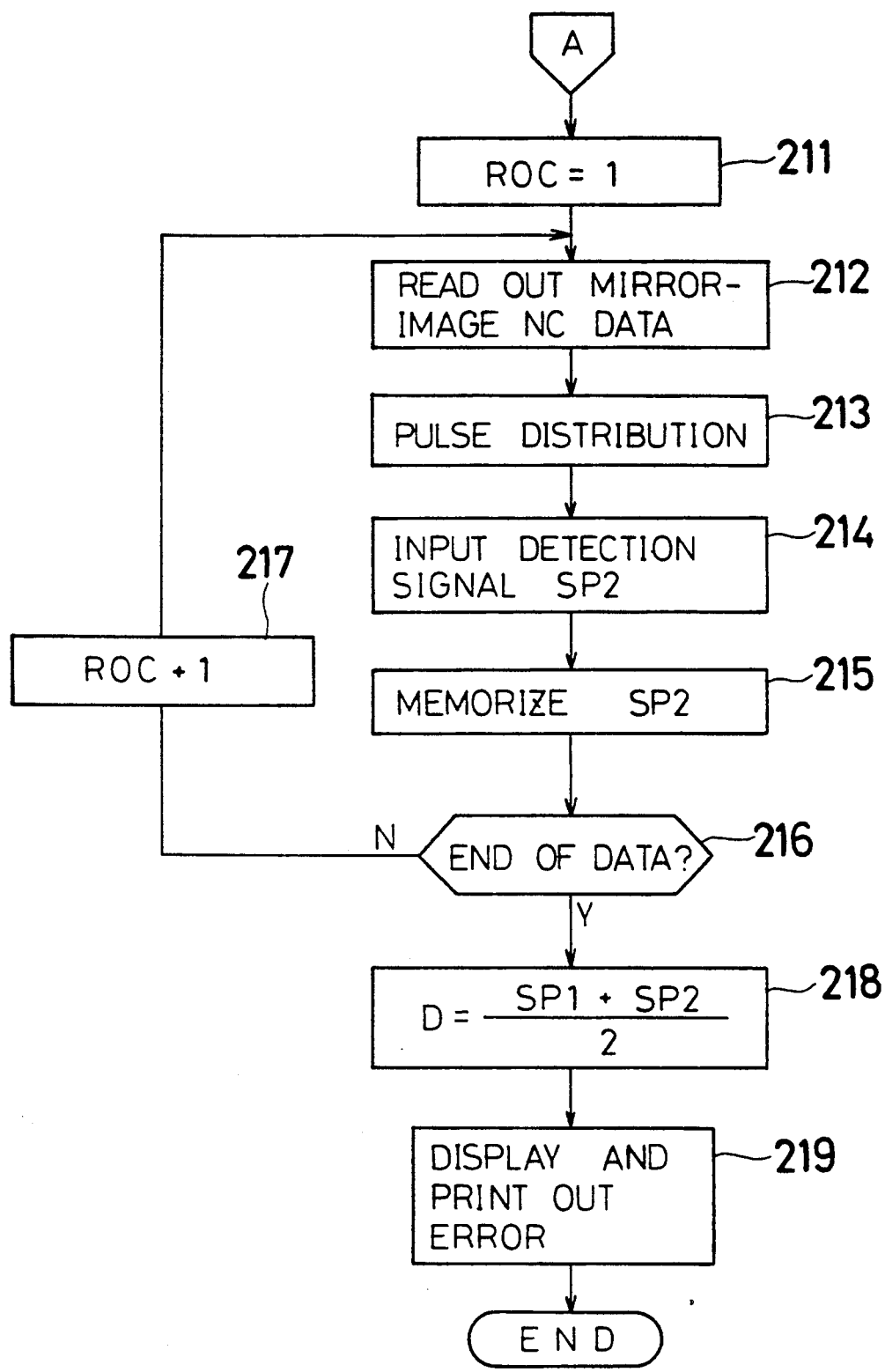

When a measurement is made, the detectors S1 and S2 are mounted on the auxiliary slides 57a and 57b, respectively, as shown in FIG. 3. Then, a measurement instruction switch installed on the control panel (not shown) is operated. The CPU 100 of the numerical control apparatus executes a program for a measurement after the rotation of the spindle 25 has been started, the program being illustrated by the flowcharts of FIGS. 7(a) and 7(b). When the operation for the measurement is started, the spindle head 21 is moved toward the right end. The detectors S1 and S2 are located close to the end of the outer surface of the workpiece W which is on the side of the spindle. First, in step 200, data which forms a mirror image of the aforementioned data for numerical control is generated according to the numerical control data stored in the memory 101. As shown in FIG. 6(b), z-axis data contained in this mirror image numerical data are the same as the z-axis data contained in the original numerical control data. However, the x-axis data and the B-axis data are reversed in sign. Then, in step 201, the detector S1 is advanced to a given position where the detector accurately measures the profile of the workpiece W. The detector S2 is moved to its rearmost position. For these movements of the detectors S1 and S2, instruction pulses are distributed among the driver circuits DUU and DUV.

Steps 202–208 are carried out to drive the servomotors 22, 41, and 43 according to the data about the numerical control. In step 202, a counter ROC for specifying the blocks of the numerical control data which are read out is initialized at 1. In step 203, data in the blocks specified by the counter ROC is read out. Thereafter, pulses are distributed among the driver circuits DUZ, DUX, and DUB according to the data read out in this way (step 204). As a result, the detector S1 is moved into a first given position where it is made stationary. In the present embodiment, the end of the workpiece W on the side of the spindle 25 is the first given position.

Figure 8:
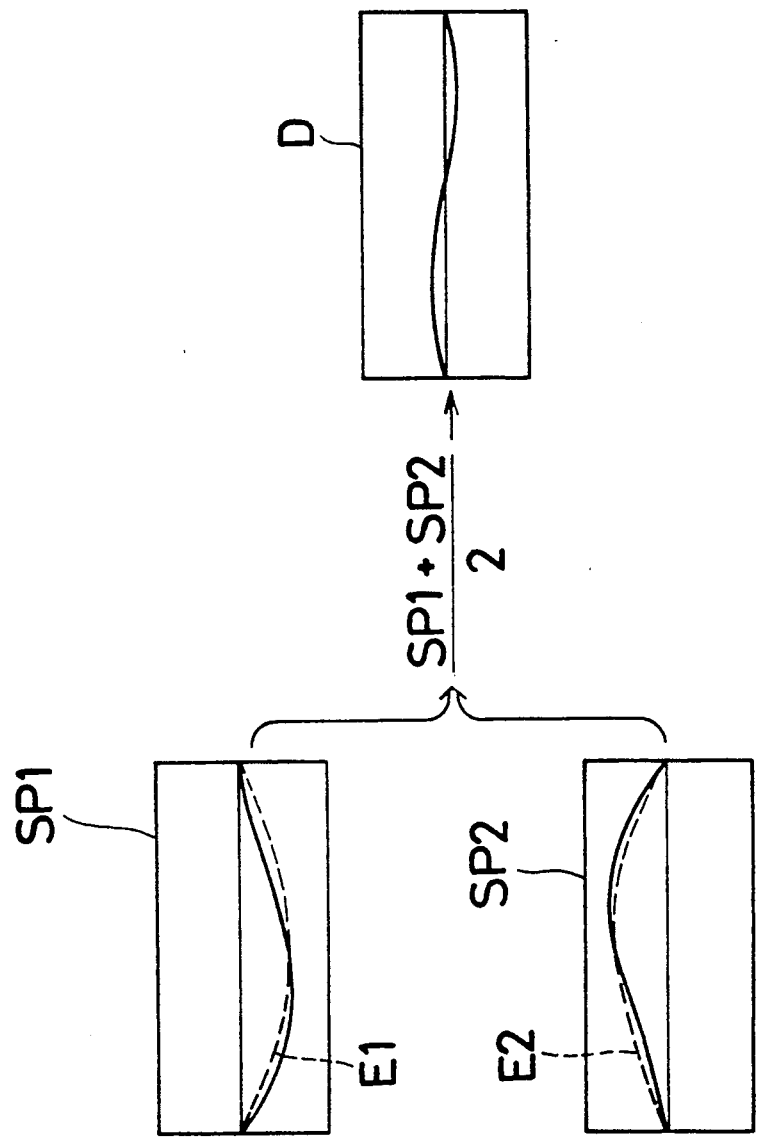
FIG. 8 is a diagram illustrating averaging processing.

Then, the first output signal SP1 from the detector S1 is read (step 205) and stored in the memory 101 (step 206). A decision is made to see whether the data read out belongs to the final block (step 207). If not so, the counter ROC is incremented (step 208), and then control goes back to step 203. The above-described operation is repeated. As a result, the spindle head 21 is shifted to the left as viewed in FIG. 2. The detector S1 crosses the outer surface of the workpiece W along the z-axis, in the same way as in the movement of the tool T during the machining operation. Also, the tool T is moved radially in synchronism with the movement of the spindle head 21. That is, the detector S1 is moved along the ideal profile of the workpiece W. At the same time, the rotary table 44 is rotated to maintain the longitudinal direction of the detector S1 perpendicular to the outer surface of the workpiece W. This permits accurate measurement. Consequently, the first output signal SP1 from the detector S1 represents the deviation from the ideal profile of the workpiece W as shown in FIG. 8 but contains a measurement error E1 due to the straightness error of the first sliding table 20 as indicated by the broken line. Since the detector S2 is placed at its rearmost position, the workpiece W does not interfere with the detector S2 during the operation described above.

When the movement of the detector S1 according to the data for numerical control is completed, the processing performed by the CPU 100 is switched from step 207 to step 209, where the first sliding table 20 is moved to the right to return the spindle head 21 to the initial position for measurement. Then, the detector S1 is moved to its rearmost position, and the detector S2 is advanced to the position for measurement (step 210). Subsequently, control goes to step 211 of FIG. 7(b). Steps 211–217 are intended to drive the servomotors 22, 41, and 43 according to the mirror image numerical control data. The processing of steps 211–217 is the same as the above-described processing of steps 202–208 and so the steps 211–217 will not be described in detail. Since the X-axis data and the B-axis data included in the mirror image numerical control data have been reversed in sign, the detector S2 is moved along the ideal profile of the workpiece W by this processing. The second output signal SP2 from the detector S2 is input (step 214) and stored in the memory 101 (step 215). As shown in FIG. 8, the second output signal SP2 represents the deviation from the ideal profile of the workpiece W but also contains a measurement error E2 produced by the straightness of the first sliding table 20 indicated by the broken line. This error E2 varies similarly to the above-described measurement error E1 but is opposite in sign to the latter error E1. In this case, the error E1 is negative, while the error E2 is positive. Accordingly, by calculating the average of the first output signal SP1 and the second output signal SP2, the profile error D from which the measurement error due to the straightness of the first sliding table has been removed can be measured. In step 218, the average of the first output signal SP1 and the second output signal SP2 is calculated. The profile error calculated in this way is displayed on the CRT and printed out (step 219). The displayed profile error takes the form of a table containing plural longitudinal positions and corresponding radial dimensional errors. A graphical display as shown in FIG. 8 may also be provided.

Figure 9A:
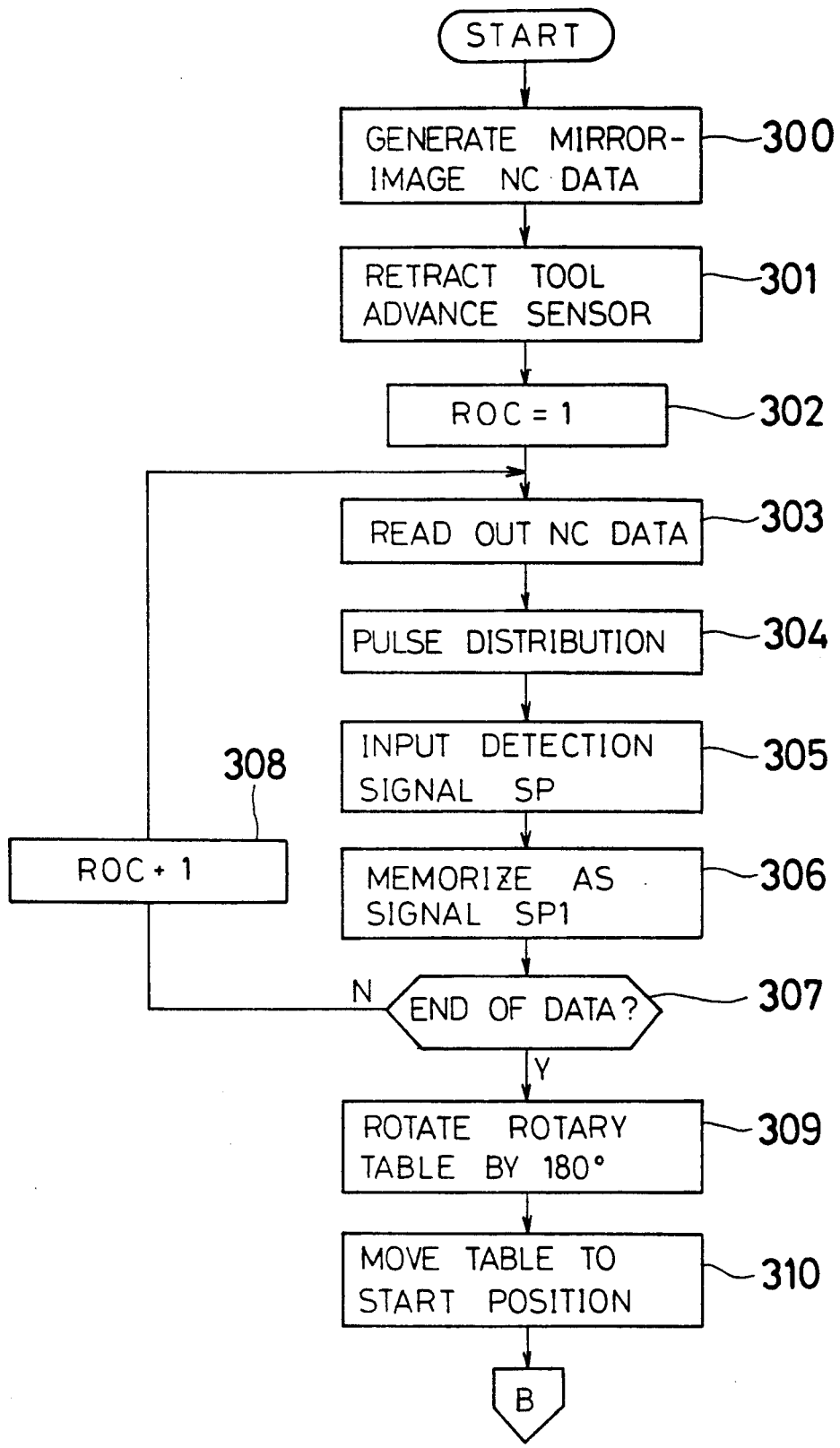
FIGS. 9, (a) and (b), are flowcharts illustrating operations performed by a CPU used in a second embodiment of the invention.
Figure 9B:
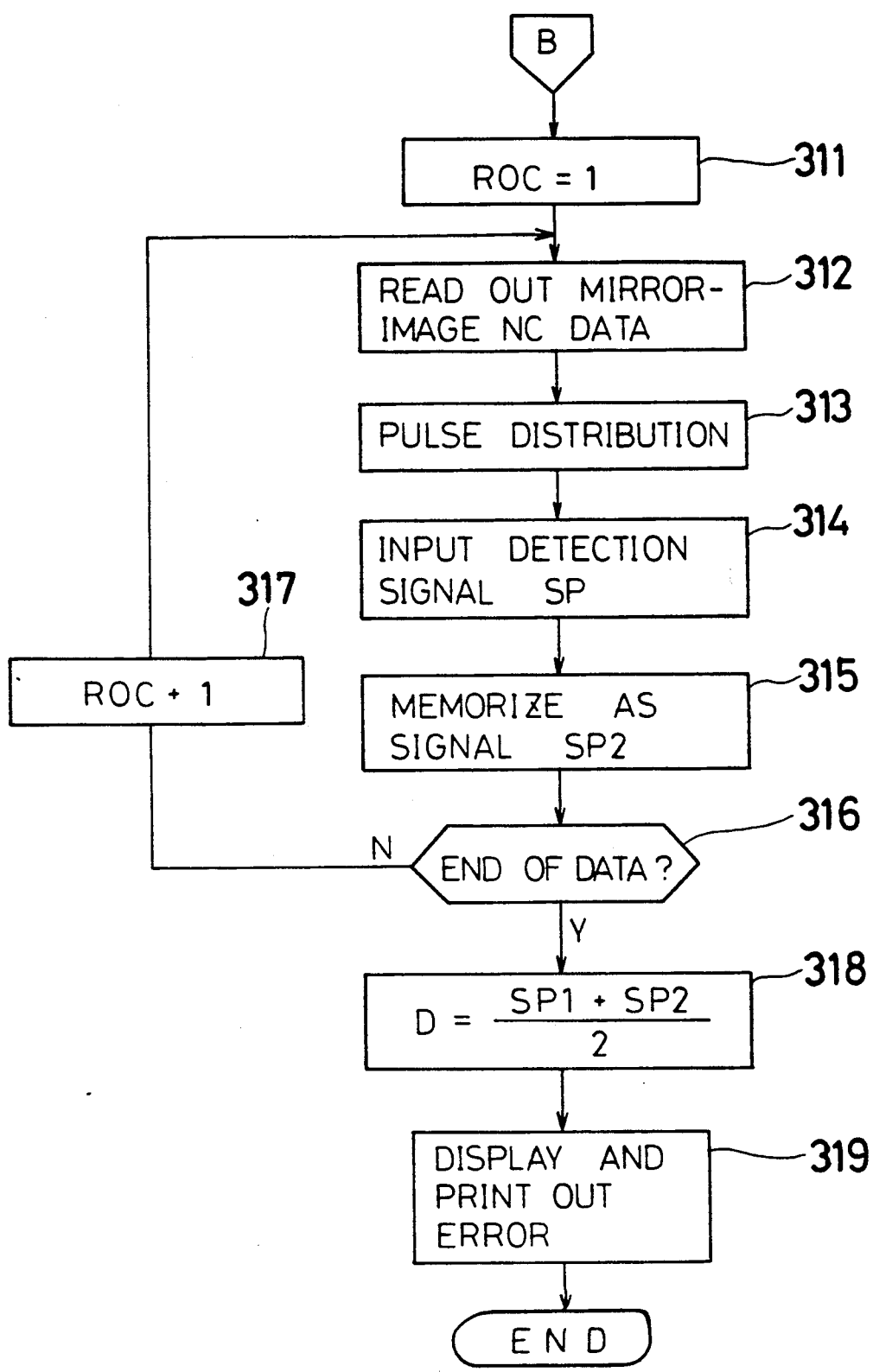
Figure 10:
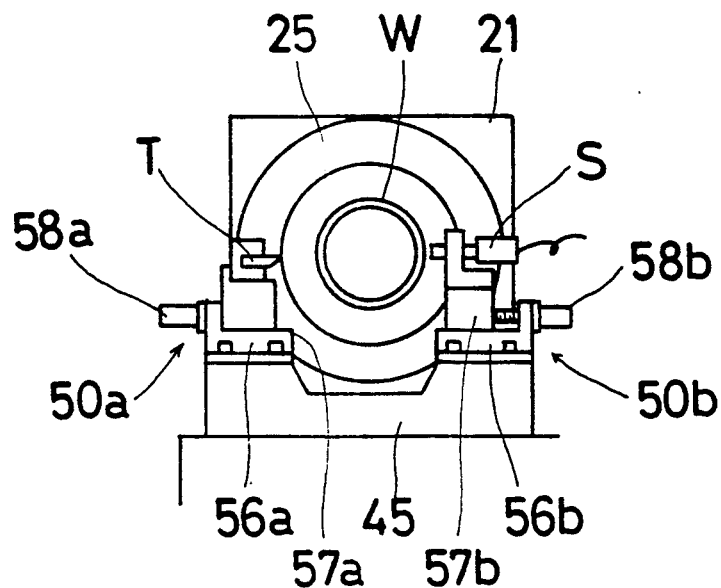
FIGS. 10 and 11 are side elevations of a machine tool used in the second embodiment, for illustrating the movement of the machine tool.
Figure 11:
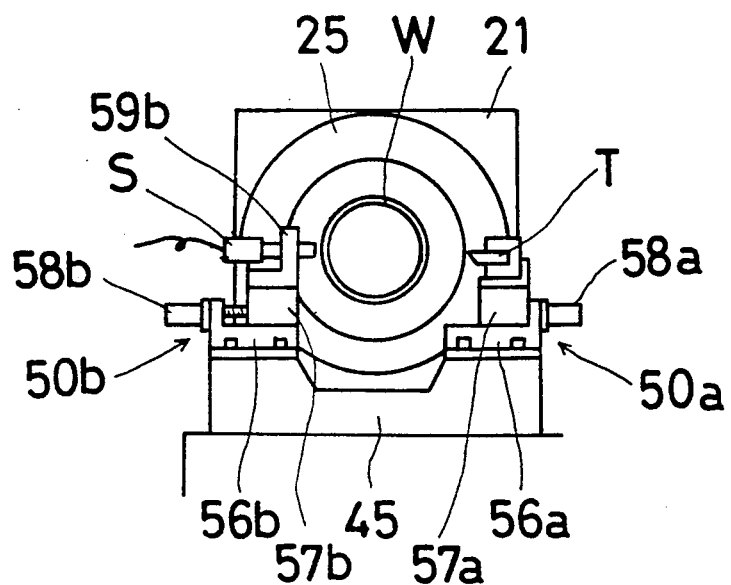

In the first embodiment described above, the profile accuracy is measured, using one pair of detectors S1 and S2. A second embodiment in which only one detector is used is described below. In this embodiment, the profile accuracy can be measured while the tool T is kept attached. First, the tool T is moved to its rearmost position as shown in FIG. 10. A detector S is advanced to a position for measurement. Under this condition, the spindle head 21 is moved once. The profile of the workpiece W is measured by the detector S. Then, the head 21 is moved to the left end as viewed in FIG. 2, and the rotary table 44 is rotated through 180°. At this time, the head 21 is located at the left end and, therefore, neither the detector S nor the tool T interferes with the workpiece W during the rotation of the table 44. By the above-described processing, the detector S is moved to the opposite side of the axis of rotation of the workpiece W. Under this condition, the profile of the workpiece is measured again. The flowchart of FIG. 9, (a) and (b), illustrates the operation of the CPU 100 in this second embodiment. The processing illustrated by this flowchart is similar to the processing performed by the CPU 100 in the first embodiment except for the following points. First, mirror image numerical control data is generated (step 300). The tool T is moved backward, while the detector S is advanced (step 301). The detector S is moved along the ideal profile of the workpiece W by the processing of steps 302-308. The output signal from the detector S is successively stored as first output signal SP1 in the memory 101 (step 306). The spindle head 21 is moved to the left end (step 309). The rotary table 44 is rotated through 180°. The head 21 is returned to the initial position for measurement (step 310). Thus, the detector S is moved to the opposite side of the axis of rotation of the workpiece W. The profile of the workpiece W is again measured by the processing of steps 311-317. At this time, the output signal from the detector S is successively stored as second output signal SP2 in the memory 101 (step 315). The average of the first output signal SP1 and the second output signal SP2 is computed (step 318). The result of the computation is displayed as a profile error D and printed out (step 319).

Figure 12:
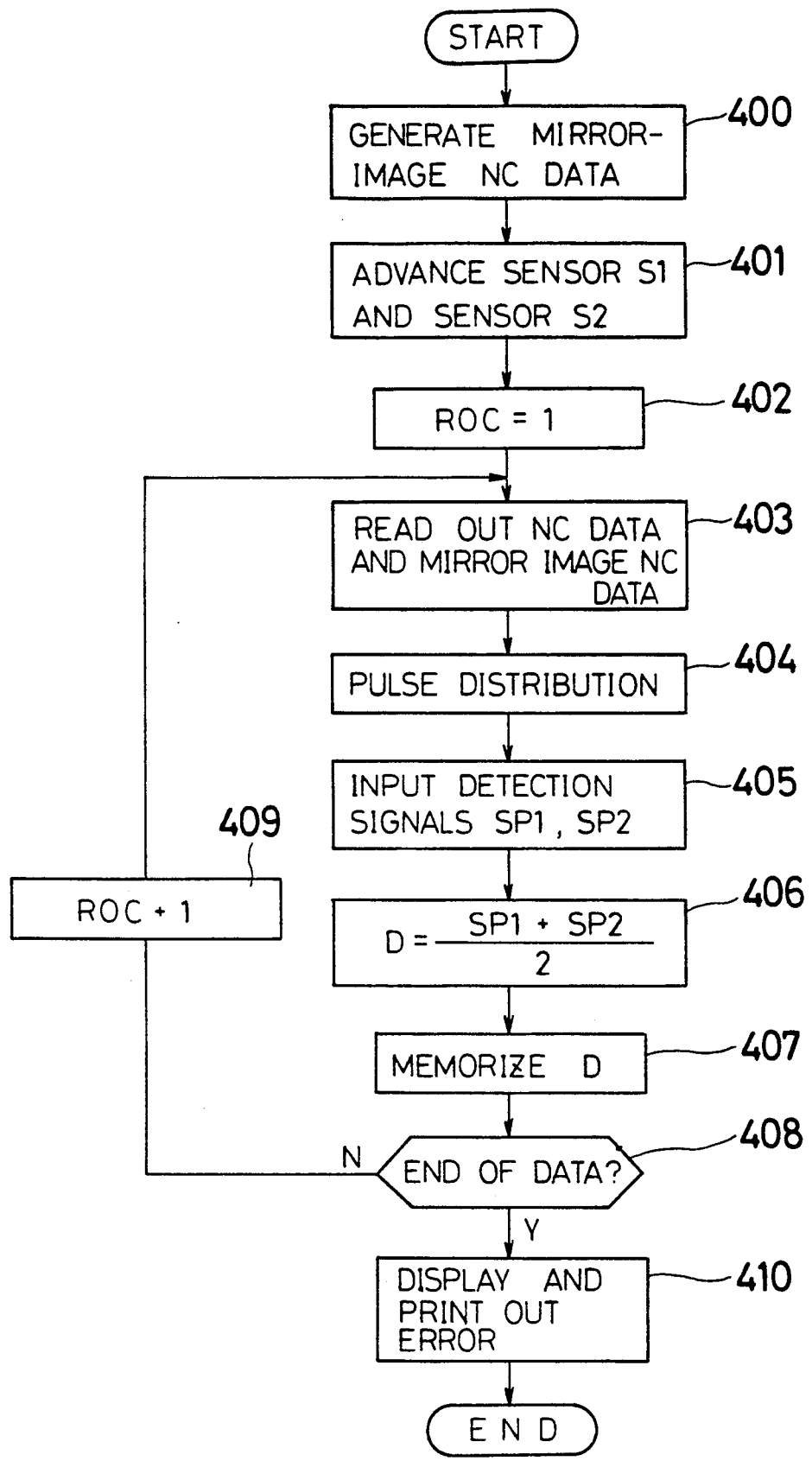
FIG. 12 is a flowchart illustrating operations of a CPU used in a third embodiment of the invention to make a measurement.

FIGS. 12 and 13 are flowcharts illustrating third and fourth embodiments, respectively, of the invention. In these embodiments, a pair of detectors are employed.

In the third embodiment illustrated in FIG. 12, the second sliding table 40 is retained at a given position. Detectors S1 and S2 are moved radially by servomotors 58a and 58b, respectively. Specifically, these detectors are moved simultaneously radially according to numerical control data and mirror image numerical control data, respectively, while the head 21 is being moved once. In this embodiment, the measurement is completed by moving the spindle head only once. In particular, the detectors S1 and S2 are advanced to positions for measurement (step 401). The detectors S1 and S2 are moved along the ideal profile of the workpiece W by the processing of steps 402-409. The profile error is calculated from the first output signal and the second output signal from the detectors S1 and S2, respectively.

In the fourth embodiment illustrated in FIG. 13, a measurement is made while the detectors S1 and S2 are kept in given positions. This method of measurement can be utilized where the radius of the workpiece W varies only a little. In this case, whenever the spindle head 21 is moved a given distance along the z-axis, the first output signal and the second output signal from the detectors S1 and S2, respectively, are read (step 501). The average D' of these two output signals is calculated (step 505). What is obtained by this calculation is not the deviation from the ideal profile of the workpiece W but data representing the profile of the workpiece W. Therefore, data indicating the ideal profile is subtracted from the obtained data, thus calculating the profile error D (step 506).

Obviously, numerous modifications and variations of the present invention are possible in light of the above teachings. It is therefore to be understood that within the scope of the appended claims, the present invention may be practiced otherwise than as specifically described herein.

What is claimed is:

1. A method of determining the profile of a cylindrical object whose radius varies with axial position, comprising the steps of:
   installing a pair of detectors on opposite sides of an axis of rotation of the object, the detectors acting to measure the radial position of the outer surface of the object;
   rotating said cylindrical object about its axis of rotation;
   moving the object to plural longitudinal positions along said axis of rotation;
   moving at least one of the detectors radially in synchronism with the movement of the object according to data about changes in the radius of an ideal profile of the object;
   calculating, for each of said longitudinal positions, the average of output signals from the detectors as a deviation from the ideal profile of the object; and
   preparing a correlation table of each of said longitudinal positions with the calculated deviation at said longitudinal position.

2. A method of determining the profile of a cylindrical object as set forth in claim 1, wherein
   (A) said cylindrical object is moved once along said axis of rotation;
   (B) both detectors are moved radially in synchronism with the movement of the object according to data about changes in the radius of the ideal profile of the object;
   (C) the output signals produced from the detectors are stored as a first output signal and a second output signal, respectively, in a memory; and
   (D) the average of the first and second output signals is calculated as the deviation from the ideal profile of the object.

3. A method of determining the profile of a cylindrical object whose radius varies with axial position, comprising the steps of:
   installing a single detector on one side of the axis of rotation of the object, the detector acting to measure the radial position of the outer surface of the object;
   rotating the cylindrical object about its axis of rotation;
   moving the object along said axis of rotation;
   moving the detector radially in synchronism with the movement of the object according to data about changes in the radius of an ideal profile of the object;
   storing the output signal from the detector in a memory as a first output signal;
   moving the detector to the opposite side of the axis of rotation of the object;
   moving the object along said axis of rotation;
   moving the detector in synchronism with the movement of the object according to data about changes in the radius of the ideal profile of the object;
   storing the output signal from the detector in the memory as a second output signal; and
   calculating the average of the first and second output signals as the deviation from the ideal profile of the object.

4. An apparatus for determining the profile of a cylindrical object whose radius varies with axial position, said apparatus comprising:
   a bed;
   a spindle head having a spindle rotated by a motor, the head being mounted on the bed, the cylindrical object being installed at the front end of the spindle such that the axis of rotation of the object agrees with the axis of the spindle;
   a sliding table mechanism guided on the bed so as to be movable at right angles to the axis of the spindle;
   a moving mechanism for moving the spindle head parallel to said axis of rotation to plural longitudinal positions relative to the sliding table mechanism;

a first control means providing control of the position of the sliding table mechanism assumed in a direction perpendicular to the axis of the spindle;

a pair of detectors mounted on opposite sides of the axis of the spindle and held by the sliding table mechanism, the detectors acting to measure the radial position of the outer surface of the object and to produce first and second output signals, respectively;

a second control means for operating the moving mechanism while the spindle is being rotated until the detectors moving along the axis of the spindle cross the outer surface of the object;

an arithmetic means which receives the first and second output signals from the detectors, respectively, and calculates, for each of said longitudinal positions, the deviation from an ideal profile of the cylindrical object from said two output signals; and means for preparing a correlating table of each of said longitudinal positions with the calculated deviation at said longitudinal position.

5. The apparatus of claim 4, wherein said moving mechanism is a feed mechanism for moving said spindle head parallel to the axis of the spindle.

6. The apparatus of claim 5, wherein (A) said second control means operates said moving mechanism in such a way that said detectors moving along the axis of the spindle cross the outer surface of the cylindrical object once;

(B) said first control means operates said sliding table mechanism in such a way that both detectors move radially according to data about changes in the radius of the ideal profile of the object; and (C) said arithmetic means calculates the average of the first and second output signals from the detectors as the deviation from the ideal profile of the object.

7. An apparatus for determining the profile of a cylindrical object whose radius varies with axial position, said apparatus comprising:

a bed;

a spindle head having a spindle rotated by a motor, the head being mounted on the bed, the cylindrical object being installed at the front end of the spindle such that the axis of rotation of the object agrees with the axis of the spindle;

a first feed mechanism for moving said spindle head parallel to the axis of the spindle;

a sliding table guided on the bed so as to be movable at right angles to the axis of the spindle;

a second feed mechanism for moving said sliding table at right angles to the axis of the spindle;

a rotary table guided on the sliding table so as to be rotatable about a vertical line passing through the axis of the spindle;

a single detector mounted on the rotary table on one side of the axis of the spindle, the detector acting to measure the radial position of the outer surface of the object;

a control means acting to operate said first feed mechanism in such a way that the detector moving along the axis of the spindle crosses the outer surface of the object, then to rotate the rotary table through 180° for moving the detector to the opposite side of the axis of the spindle, to operate the first feed mechanism again in such a way that the detector moving along the axis of the spindle crosses the outer surface of the object, and to operate said second feed mechanism for moving the detector according to data about changes in the radius of the ideal profile of the object during the first and second movements of the detector; and an arithmetic means which stores the output signal from the detector as a first output signal during the first movement, stores the output signal from the detector as a second output signal during the second movement, and calculates the average of the first and second output signals as the deviation from the ideal profile of the object.

8. A machine tool for machining the outer surface of a cylindrical object whose radius varies with axial position, said machine tool comprising:

a bed;

a spindle head having a spindle rotated by a motor, the head being mounted on the bed, the cylindrical object being installed at the front end of the spindle such that the axis of rotation of the object agrees with the axis of the spindle;

a first feed mechanism for moving said spindle head parallel to the axis of the spindle;

a sliding table guided on the bed so as to be movable at right angles to the axis of the spindle;

a second feed mechanism for moving said sliding table at right angles to the axis of the spindle;

a rotary table guided on the sliding table so as to be rotatable about a vertical line passing through the axis of the spindle;

a tool mounted on the rotary table on one side of the axis of the spindle;

a detector mounted on the rotary table on the other side of the axis of the spindle, the detector acting to measure the radial position of the outer surface of the object;

a control means acting to operate the first feed mechanism in such a way that the detector moving along the axis of the spindle crosses the outer surface of the object, then to rotate the rotary table through 180° for moving the detector to said one side of the axis of the spindle, to operate the first feed mechanism again in such a way that the detector moving along the axis of the spindle crosses the outer surface of the object, and to operate the second feed mechanism for moving the detector according to data about changes in the radius of the ideal profile of the object during the first and second movements of the detector; and an arithmetic means which stores the output signal from the detector as a first output signal during the first movement, stores the output signal from the detector as a second output signal during the second movement, and calculates the average of the first and second output signals as the deviation from the ideal profile of the object.

9. A method of determining the profile of a cylindrical object whose radius varies with axial position, comprising the steps of:

installing a pair of detectors on opposite sides of an axis of rotation of the object, the detectors acting to measure the radial position of the outer surface of the object;

rotating said cylindrical object about its axis of rotation;

moving the object to plural longitudinal positions along said axis of rotation;

maintaining said detectors at given radial positions during said step of moving the object to plural longitudinal positions along said axis of rotation; and calculating, for each of said longitudinal positions, the average of output signals from the detectors as the deviation from the ideal profile of the object.

10. A method of determining the profile of a cylindrical object as set forth in claim 9, wherein
said cylindrical object is moved once along said axis of rotation;
the output signals produced from the detectors are stored as first and second output signals, respectively, in a memory; and
the average of the first and second output signals is calculated as the profile of the object.

11. An apparatus for determining the profile of a cylindrical object whose radius varies with axial position, said apparatus comprising:
a bed;
a spindle head having a spindle rotated by a motor, the head being mounted on the bed, the cylindrical object being installed at the front end of the spindle such that the axis of rotation of the object agrees with the axis of the spindle;
a sliding table mechanism guided on the bed so as to be movable at right angles to the axis of the spindle;
a moving mechanism for moving the spindle head parallel to the axis of rotation to plural longitudinal positions relative to the sliding table mechanism;
a first control means providing control of the position of the sliding table mechanism assumed in a direction perpendicular to the axis of the spindle;
a pair of detectors mounted on opposite sides of the axis of the spindle and held by the sliding table mechanism, the detectors acting to measure the radial position of the outer surface of the object and to produce first and second output signals, respectively;
a second control means for operating the moving mechanism while the spindle is being rotated until the detectors moving along the axis of the spindle cross the outer surface of the object, the first control means further comprising means for maintaining the detectors at fixed radial positions when the spindle head is being moved by the moving mechanism to the plural longitudinal positions; and
an arithmetic means which receives the first and second output signals from the detectors, respectively, and calculates the deviation from an ideal profile of the cylindrical object from the two output signals.

12. The apparatus of claim 11, wherein:
said second control means operates said moving mechanism in such a way that both detectors moving along the axis of the spindle cross the outer surface of the cylindrical object once; and
said arithmetic means calculates the profile of the object from the average of the first and second output signals produced from the detectors, respectively.

13. A method of determining the profile of a cylindrical object whose radius varies with axial position, comprising the steps of:
installing a pair of detectors on opposite sides of an axis of rotation of the object, the detectors acting to measure the radial position of the outer surface of the object;
rotating said cylindrical object about its axis of rotation;
moving the object to plural longitudinal positions along said axis of rotation;
moving at least one of the detectors radially in synchronism with the movement of the object according to data about changes in the radius of an ideal profile of the object; and
calculating, for each of said longitudinal position, the average of the output signals from the detectors as a deviation from the ideal profile of the object, wherein:
(A) said cylindrical object is moved twice along said axis of rotation;
(B) during the first movement, one of the detectors is moved radially according to data about changes in the radius of the ideal profile of the cylindrical object, and the output signal from said one detector is stored as a first output signal in a memory;
(C) during the second movement, the other detector is moved radially according to data about changes in the radius of the ideal profile of the object, and the output signal from the other detector is stored as a second output signal in the memory; and
(D) the average of the first and second output signals is calculated as the deviation from the ideal profile of the object.

14. An apparatus for determining the profile of a cylindrical object whose radius varies with axial position, said apparatus comprising:
a bed;
a spindle head having a spindle rotated by a motor, the head being mounted on the bed, the cylindrical object being installed at the front end of the spindle such that the axis of rotation of the object agrees with the axis of the spindle;
a sliding table mechanism guided on the bed so as to be movable at right angles to the axis of the spindle;
a moving mechanism for moving the spindle head parallel to said axis of rotation to plural longitudinal positions relative to the sliding table mechanism;
a first control means providing control of the position of the sliding table mechanism assumed in a direction perpendicular to the axis of the spindle;
a pair of detectors mounted on opposite sides of the axis of the spindle and held by the sliding table mechanism, the detectors acting to measure the radial position of the outer surface of the object and to produce first and second output signals, respectively;
a second control means for operating the moving mechanism while the spindle is being rotated until the detectors moving along the axis of the spindle cross the outer surface of the object; and
an arithmetic means which receives the first and second output signals from the detectors, respectively, and calculates, for each of said longitudinal positions, a deviation from an ideal profile of the cylindrical object from these two output signals, wherein:
(A) said second control means operates said moving mechanism in such a way that said detectors moving along the axis of the spindle cross the outer surface of the cylindrical object twice;
(B) said first control means operates said sliding table mechanism in such a way that one of the detectors moves radially according to data about changes in the radius of an ideal profile of the object during the first movement of the detectors;

(C) said first control means operates said sliding table mechanism in such a way that the other detector moves radially according to data about changes in the radius of the ideal profile of the object during the second movement of the detectors;

(D) said arithmetic means stores the output signal from said one detector as a first output signal during said first movement and stores the output signal from the other detector as a second output signal during said second movement; and (E) said arithmetic means calculates the average of the first and second output signals as the deviation from the ideal profile of the object.

* * * * *

UNITED STATES PATENT AND TRADEMARK OFFICE
CERTIFICATE OF CORRECTION

PATENT NO. : 5,335,183
DATED : August 2, 1994
INVENTOR(S) : Akira TSUBOI, et al.

It is certified that error appears in the above-indentified patent and that said Letters Patent is hereby corrected as shown below:

On the title page, Item [73], the Assignee should read as follows:

--Toyoda Koki Kabushiki Kaisha--

Signed and Sealed this

Fifteenth Day of November, 1994

Attest:

BRUCE LEHMAN

*Attesting Officer*    *Commissioner of Patents and Trademarks*